US011065860B2

(12) United States Patent
Drewnowski et al.

(10) Patent No.: US 11,065,860 B2
(45) Date of Patent: Jul. 20, 2021

(54) METHOD AND SYSTEM FOR PRINTING 3D OBJECTS

(71) Applicant: Corning Incorporated, Corning, NY (US)

(72) Inventors: Christopher William Drewnowski, Corning, NY (US); Michael Thomas Gallagher, Painted Post, NY (US); Scott Michael Jarvis, Ithaca, NY (US); Xinghua Li, Horseheads, NY (US); Moussa N'Gom, Ypsilanti, MI (US); Robert Stephen Wagner, Corning, NY (US); Nicholas Ryan Wheeler, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 243 days.

(21) Appl. No.: 15/752,120

(22) PCT Filed: Aug. 12, 2016

(86) PCT No.: PCT/US2016/046713
§ 371 (c)(1),
(2) Date: Feb. 12, 2018

(87) PCT Pub. No.: WO2017/027784
PCT Pub. Date: Feb. 16, 2017

(65) Prior Publication Data
US 2018/0237329 A1     Aug. 23, 2018

Related U.S. Application Data

(60) Provisional application No. 62/204,625, filed on Aug. 13, 2015.

(51) Int. Cl.
*B33Y 10/00*     (2015.01)
*C03B 19/02*     (2006.01)
(Continued)

(52) U.S. Cl.
CPC ............ *B33Y 10/00* (2014.12); *B23K 26/342* (2015.10); *B29C 64/118* (2017.08); *B33Y 30/00* (2014.12);
(Continued)

(58) Field of Classification Search
None
See application file for complete search history.

(56) References Cited

U.S. PATENT DOCUMENTS 5,578,227 A     11/1996   Rabinovich
6,143,378 A     11/2000   Harwell et al.
(Continued)

FOREIGN PATENT DOCUMENTS

CN     101623929 A     1/2010
CN     102403466 A     4/2012
(Continued)

OTHER PUBLICATIONS

Czigány et al., A Comparative Analysis of Hollow and Solid Glass Fiber Reinforced Composites, ECCM15—15th European Conference on Composite Materials, Venice, Italy, Jun. 24-28, 2012, 7 pages. (Year: 2012).*

(Continued)

*Primary Examiner* — Lisa L Herring

(57) ABSTRACT

A method of printing a 3D object includes feeding one or more preformed materials from a feed outlet into a build zone in which a hot spot is located and using the hot spot to selectively heat the one or more preformed materials to a viscous state. Object layers are formed by depositing portions of the preformed materials on a build surface, or on another object layer on the build surface, while effecting relative motion between the build surface and the feed outlet.

12 Claims, 8 Drawing Sheets

(51) Int. Cl.
  *B33Y 80/00* (2015.01)
  *B33Y 30/00* (2015.01)
  *C03B 23/20* (2006.01)
  *B23K 26/342* (2014.01)
  *B29C 64/118* (2017.01)
  *C03B 23/24* (2006.01)
  *B33Y 70/00* (2020.01)

(52) U.S. Cl.
  CPC .............. *B33Y 80/00* (2014.12); *C03B 19/02* (2013.01); *C03B 23/20* (2013.01); *C03B 23/245* (2013.01); *B33Y 70/00* (2014.12)

(56) References Cited

U.S. PATENT DOCUMENTS

| | | | |
|---|---|---|---|
| 7,168,935 | B1 | 1/2007 | Taminger et al. |
| 9,844,913 | B2 | 12/2017 | Bessac et al. |
| 2009/0295042 | A1* | 12/2009 | Pfister ................. C08J 3/28 264/497 |
| 2014/0374949 | A1 | 12/2014 | Toh et al. |
| 2015/0076739 | A1* | 3/2015 | Batchelder ............ B33Y 10/00 264/401 |
| 2015/0307385 | A1* | 10/2015 | Klein .................. C03B 25/02 65/29.11 |
| 2017/0050379 | A1* | 2/2017 | Houben ................ B33Y 10/00 |
| 2017/0355633 | A1 | 12/2017 | Cook et al. |
| 2018/0207722 | A1* | 7/2018 | Feldmann ............. B29C 64/20 |

FOREIGN PATENT DOCUMENTS

| | | |
|---|---|---|
| CN | 102690046 A | 9/2012 |
| CN | 104401002 A | 3/2015 |
| EP | 0745564 A1 | 12/1996 |
| JP | 58190827 A | 11/1983 |
| JP | 2016-210068 A | 12/2016 |

OTHER PUBLICATIONS

Bagger et al; "Review of Laser Hybrid Welding"; Journal of Laser Applications, 17, 2 (2005) pp. 2-14.

Huang et al; "Direct Welding of Fused Silica With Femtosecond Fiber Laser"; Society of Photo-Optical Instrumentation Engineers (SPIE) Conference Series, Feb. 2012; 9 Pages.

International Search Report and Written Opinion of the International Searching Authority; PCT/US2016/046713 dated Oct. 24, 2016; 10 Pages; European Patent Office.

Luo et al; "Additive Manufacturing of Glass"; Journal of Manufacturing Science and Engineering; Dec. 2014, vol. 136; pp. 061024-1-061024-6.

Mackwood et al; "Thermal Modelling of Laser Welding and Related Processes: A Literature Review"; Optics & Laser Technology, 37 (2005) 99-115.

Chinese Patent Application No. 201680048267.5; English Translation of the First Office Action dated Mar. 5, 2020; China Patent Office; 11 Pgs.

Chinese Patent Application No. 201680048267.5 First Office Action dated Nov. 19, 2020; 16 Pages; (English Translation Only) Chinese Patent Office.

European Patent Application No. 16756888.0 Communication pursuant to Article 94(3) EPC dated Apr. 1, 2020; 5 Pages; European Patent Office.

Global Dossier Translation of JP2018506920 Office Action dated July 15, 2020; 6 Pages; Japanese Patent Office.

Luo et al., "Wire-Fed Additive Manufacturing of Transparent Glass Parts", ASME 2015 International Manufacturing Science and Engineering Conference, vol. 1, Jun. 8, 2015, pp. V001T02A108-1.

* cited by examiner

METHOD AND SYSTEM FOR PRINTING 3D OBJECTS

CROSS-REFERENCE TO RELATED APPLICATIONS

This application claims the benefit of priority under 35 U.S.C. § 365 of International Patent Application Serial No. PCT/US16/46713 filed on Aug. 12, 2016, which in turn claims the benefit of priority to U.S. Provisional Application Ser. No. 62/204,625 filed on Aug. 13, 2015, the content of each are relied upon and incorporated herein by reference in their entirety.

BACKGROUND

Flat glass can be formed into 3D glass using processes such as molding and pressing. However, forming complex glass parts with internal features, such as internal channels and the like, using these methods is difficult to near impossible. Machining can be used to form holes, for example, by drilling, in glass blocks. However, it is also difficult to form internal features in glass blocks using machining.

Additive manufacturing (AM), popularly referred to as 3D Printing, allows 3D parts to be built directly from a computer-aided design (CAD) model of the part. The 3D part is built layer by layer, which allows features to be built into each layer and contained within the part as internal features if so desired. AM can work with solid, liquid, and powder materials. However, very few of the available AM technologies indicate glass as a suitable raw material and virtually none claim the ability to produce transparent 3D printed glass.

SUMMARY

A process and system for printing 3D objects are disclosed. The process and system are suitable for making 3D objects from glass and glass-ceramic materials. The process and system may allow 3D objects to be made from other raw materials besides glass and glass-ceramics.

In one illustrative embodiment, a method of printing a 3D object includes providing a description of the 3D object as a set of at least two object layers that can be stacked one on top of another to form the object and providing a material deposition pattern for each object layer. The method further includes creating a hot spot in a build zone located between a feed outlet and a build surface. The method includes feeding one or more preformed materials in a predetermined sequence through the feed outlet into the build zone and using the hot spot to selectively heat the one or more preformed materials to a viscous state. The method includes forming a first object layer of the set of object layers by depositing a first portion of the one or more preformed materials on the build surface from the build zone and effecting a relative motion between the build surface and the feed outlet during the depositing such that the first portion of the one or more preformed materials forms the material deposition pattern corresponding to the first object layer. The method further includes forming a second object layer of the set of object layers by depositing a second portion of the one or more preformed materials on the build surface from the build zone and effecting a relative motion between the build surface and the feed outlet during the depositing such that the second portion of the one or more performed materials forms the material deposition pattern corresponding to the second object layer.

In another illustrative embodiment, an apparatus for printing a 3D object includes a build plate having a build surface. The apparatus may further include a feed system having a feed outlet positioned above the build surface. The feed system is configured to feed a preformed material into a build zone between the feed outlet and the build surface. The apparatus may further include a laser delivery system arranged to direct at least one laser beam into the build zone to form a hot spot in the build zone. The apparatus may further include a positioning system arranged to effect a relative motion between the build surface and the feed outlet.

In another illustrative embodiment, a manufactured glass article includes a plurality of glass layers arranged in a stack to form a three-dimensional object having a select shape. Each glass layer has a predetermined shape and is fused to an adjacent glass layer at least at one contact point. The glass layers are transparent.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

DETAILED DESCRIPTION

Figure 1:
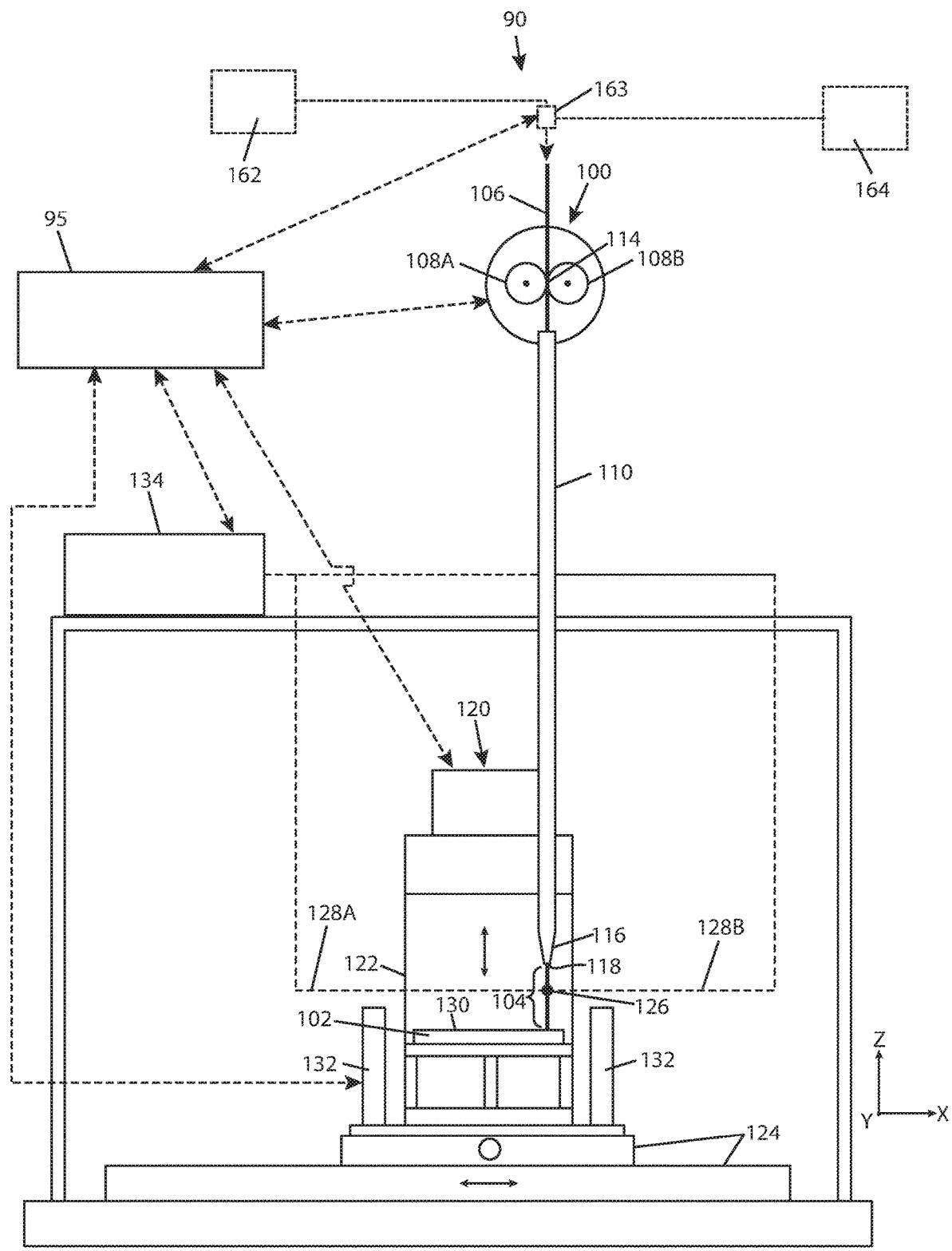
FIG. 1 shows a system for printing a 3D object according to one embodiment.

FIG. 1 shows one embodiment of a system 90 for printing a 3D object. The system 90 includes a feed system 100 arranged above a build plate 102. The area 104 between the feed system 100 and the build plate 102 may be referred to as a build zone. The feed system 100 can be operated to feed a preformed material 106 into the build zone 104. The term "preformed material" refers to material that has been formed or shaped beforehand. Typically, the preformed material will have a longitudinal axis. The preformed material 106 may be in the form of a rod, a fiber, a thin sheet, or a ribbon. The rod may have a round cross-section or a non-round cross-section, such as a square or rectangular cross-section. The rod may be solid or may have a hollow core. The fiber may have a transparent core or a hollow core. The core of the fiber, whether transparent or hollow, may have any desired cross-sectional shape, such as circular or elliptical. The fiber may have any desired cross-sectional shape, such as round, square, or flat. The diameter of the fiber or rod may be in a range from 100 µm to 7 mm. Typically, a rod will have a larger diameter and will be shorter than a fiber. The thickness of the thin sheet and ribbon may be in a range from 10 µm to 7 mm. The length of the preformed material 106 can be variable. In one embodiment, the preformed material 106 is composed of glass or glass-ceramic. In other embodiments, the preformed material 106 may be composed of a viscoelastic material besides glass and glass-ceramic or may be composed of a composite material including a viscoelastic material as one component.

The feed system 100 may generally include a pair of feed wheels 108A, 108B for advancing a preformed material 106 in a direction towards the build zone 104. The feed system 100 may further include a guide tube 110 for guiding the preformed material 106 into the build zone 104. In one embodiment, the guide tube 110 has an internal longitudinal passage (not visible in the drawing) that is aligned to receive the preformed material 106 from the feed wheels 108A, 108B. The guide tube 110 may have a guide tip 116 with an opening 118 that is sized and shaped just to accommodate the cross-section of the preformed material 106, which may enable precise delivery of the preformed material 106 into the build zone 104. The opening 118, or wherever the preformed material 106 emerges from the feed system 100 into the build zone 104, may be referred to as the feed outlet of the feed system 100.

In some cases, the preformed material 106 may be in a form that can be wound around a spool (not shown). In this case, the feed wheels 108A, 108B may pull a desired length of the preformed material 106 from the spool as needed. In some cases, the preformed material 106 may be in the form of a ribbon conveyed to the feed system 100. In some embodiments, the spacing 114 between the feed wheels 108A, 108B, i.e., where the preformed material 106 passes in between the feed wheels 108A, 108B, may be adjustable so that the feed wheels 108A, 108B can feed different preformed material diameters or thicknesses to the guide tube 110. Also, the guide tube 110 and guide tip 116 may be interchangeable with other guide tubes and guide tips to allow delivery of the different preformed material diameters or thicknesses into the build zone 104.

In one embodiment, the build plate 102 is mounted on a positioning system 120. In one embodiment, the positioning device 120 is capable of translating the build plate 102 along three orthogonal directions, i.e., along X, Y, and Z axes. As an example, the positioning system 120 may include a Z stage 122 to allow translation of the build plate 102 along the Z axis and an XY stage 124 to allow translation of the build plate 102 in the XZ plane. The positioning system 120 will allow relative motion between the build plate 102 and the feed outlet 118 in three orthogonal directions. Instead of mounting the build plate 102 on a positioning system 120, or in addition to mounting the build plate 102 on the positioning system 120, the feed system 100 may be mounted to a separate positioning system (not shown) such that the position of the feed outlet 118 relative to the build plate 102 can be adjusted. However, it may be more convenient to move the build plate 102 relative to the feed outlet 118. In general, any method of effecting relative motion between the build plate 102 and the feed outlet 118 in any of three orthogonal directions may be used. Relative motion between the feed outlet 118 and the build plate 102 will allow the preformed material 106 to be deposited on the build plate 102 in a desired pattern.

In one embodiment, a hot spot 126 is created in the build zone 104, between the feed outlet 118 and the build plate 102. In one embodiment, the hot spot 126 is aligned with the feed outlet 118 such that the preformed material 106 passes from the feed outlet 118 through the hot spot 126 prior to reaching the build plate 102. In one embodiment, the preformed material 106 is selectively heated to a viscous state by the hot spot 126. The term "selectively heated" means that the entire preformed material 106 dispensed into the build zone 104 or just selected sections of the preformed material 106 dispensed into the build zone 104 may be heated to the viscous state. This also means that the hot spot 126 has to be controllable. For example, it should be possible to turn the hot spot 126 on or off or to control the temperature and size of the hot spot 126. In one embodiment, the preformed material 106 is selectively heated to a temperature between the annealing point and up to the melting point of the material by the hot spot 126.

In one embodiment, the hot spot 126 is created using one or more laser beams from a laser delivery system, generally identified by the reference numeral 134. As an example, FIG. 1 shows that two laser beams 128A, 128B are used to create the hot spot 126 in one embodiment. The laser beams 128A, 128B approach the build zone 104 from opposed directions. Such opposed laser beams will enable uniform heating around the diameter or thickness of the preformed material 106 at the hot spot 126. In one embodiment, the laser beams 128A, 128B provided by the laser delivery system 134 are Gaussian beams, and the beam diameter of the laser beams 128A, 128B at the hot spot 126 can be controlled. In one embodiment, the beam diameter of each laser beam 128A, 128B is selected from a range between 1 to 2 times the thickness of the preformed material 106 to be processed by the hot spot 126.

Figure 2A:
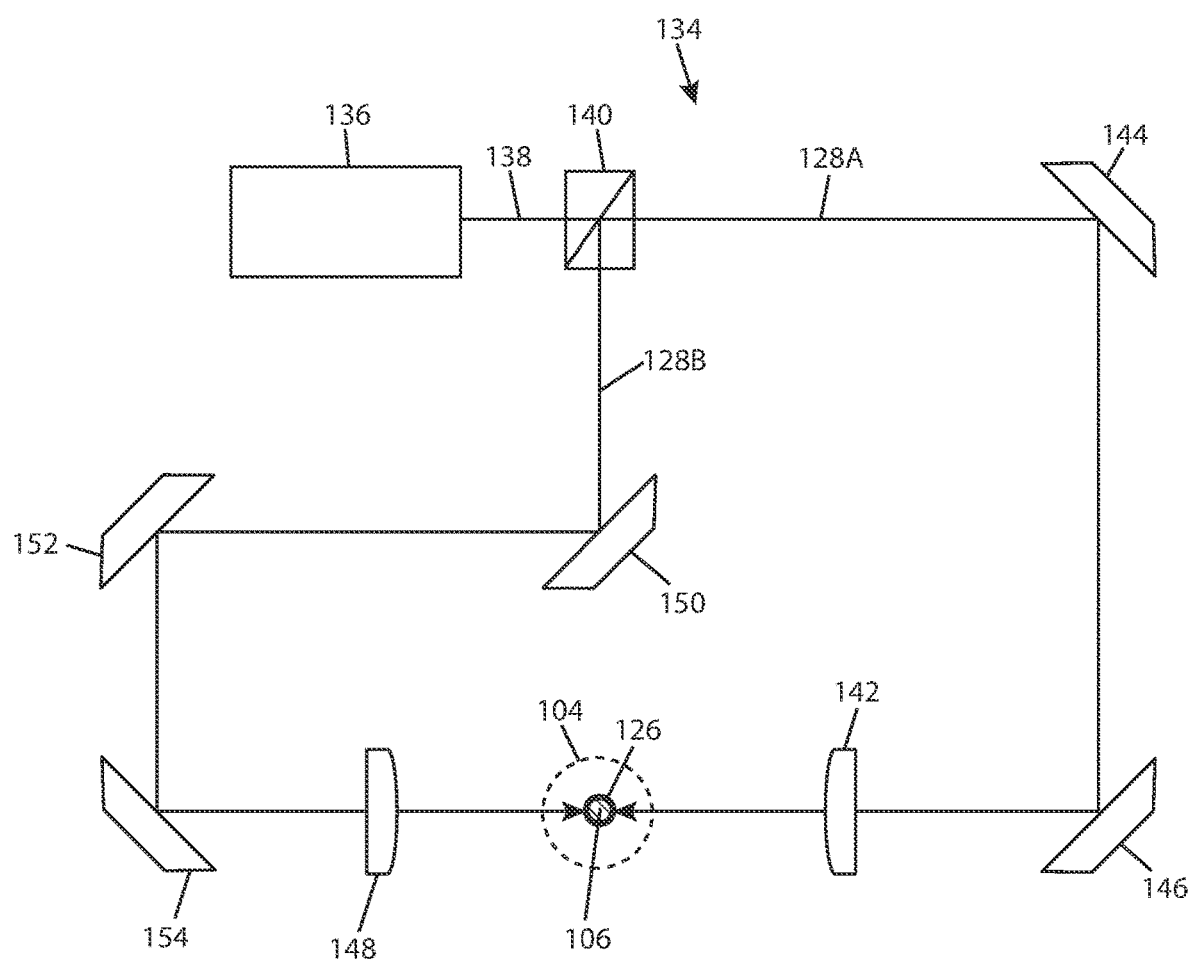
FIG. 2A shows a laser delivery system according to one embodiment.
Figure 2C:
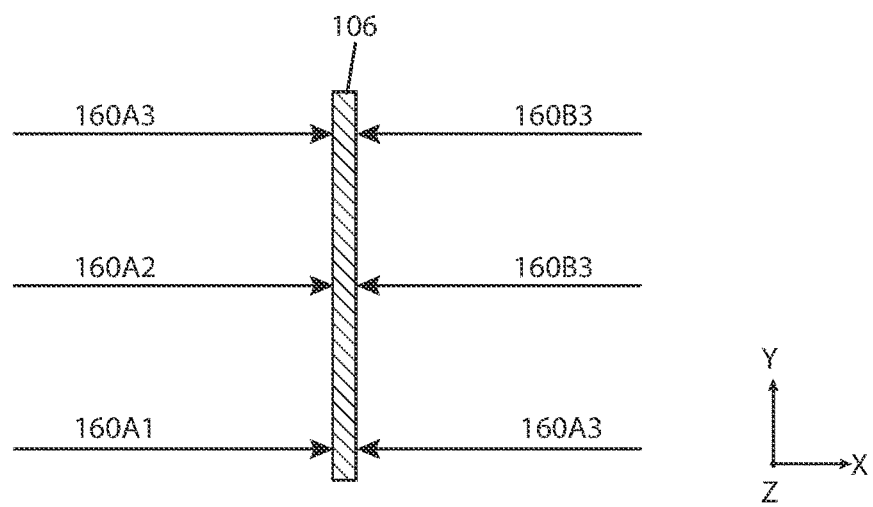
FIG. 2C shows multi-path laser delivery according to one embodiment.
Figure 2B:
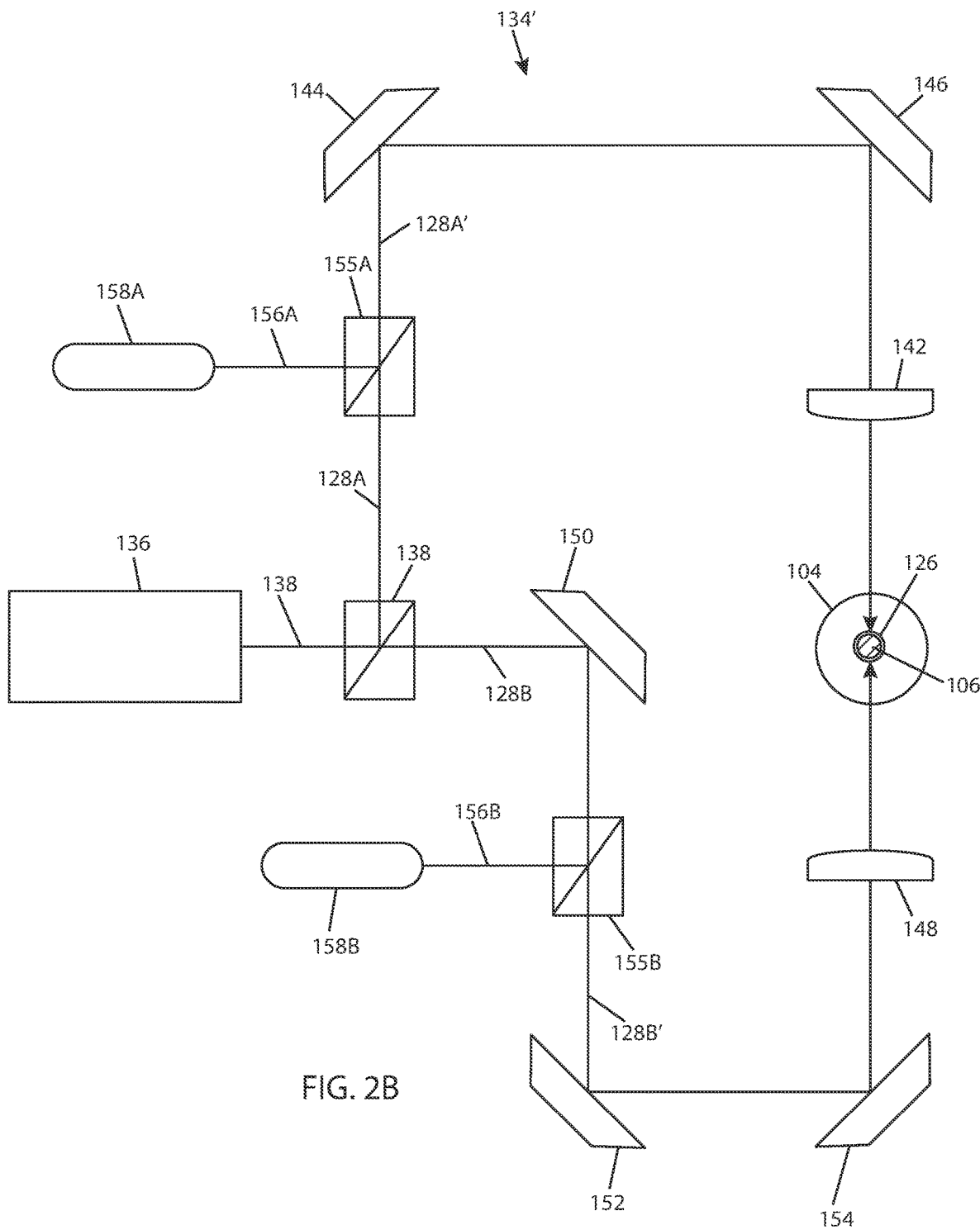
FIG. 2B shows a laser delivery system according to another embodiment.

FIG. 2B shows one embodiment of the laser delivery system 134. An alternate embodiment of the laser delivery system 134 is shown at 134' in FIG. 2B. In FIG. 2A, the laser delivery system 134 includes a laser source 136, which generates a laser beam 138. If the preformed material 106 is made of glass or glass-ceramic, the laser source 136 may be an infrared laser capable of generating an infrared laser beam, such as $CO_2$ laser and the like. In general, the laser source 136 should be capable of generating a laser beam in a wavelength range in which the preformed material 106 will be absorbing so as to allow the preformed material 106 to be selectively heated to a viscous state. For example, $CO_2$ laser emits wavelengths within the absorption range of glass and can be used for processing of glass materials. A beam splitter 140 is arranged to split the laser beam 138 into two separate laser beams 128A, 128B traveling in different directions, e.g., in orthogonal directions. In the arrangement shown in FIG. 2A, the first laser beam 128A is directed to a focusing lens 142 by means of mirrors 144, 146, and the focusing lens 142 focuses the first laser beam 128A into the build zone 104. Similarly, the second laser beam 128B is directed to a focusing lens 148 by means of mirrors 150, 152, 154, and the focusing lens 148 focuses the second laser beam 128B into the build zone 104. The focused laser beams 128A, 128B form the hot spot 126 within which the preformed material 106 can be selectively heated to a viscous state.

In the alternate laser delivery system 134' shown in FIG. 2B, a beam combiner 155A combines the first laser beam 128A with a secondary laser beam 156A. The combined laser beam 128A' is directed and focused into the build zone 104 using the mirrors 144, 146 and focusing lens 142. The secondary laser beam 156A may be generated by a secondary laser source 158A. In one embodiment, the secondary laser beam 156A has a different wavelength compared to the first laser beam 128A. For example, the secondary laser beam 156A may be in a wavelength range in which the preformed material 106 would not be absorbing, while the first laser beam 128A may be in a wavelength range in which the preformed material 106 would be absorbing. In one embodiment, the secondary laser beam 156A has a wavelength in the visible range, while the first laser beam 128A has a wavelength in the infrared range. In this case, the secondary laser source 158A may be a HeNe laser or other suitable visible laser. Combining a visible laser beam 156A with an invisible laser beam 128A will produce a combined laser beam 128A' that is visible. This can help align the invisible laser beam 128A with the target location at which the hot spot 126 is to be created. The visible laser beam 156A will generally not have any significant effect on the temperature of the hot spot 126.

Similarly, a beam combiner 155B combines the second laser beam 128B with a secondary laser beam 156B, and the combined laser beam 128B' is directed and focused into the build zone 104 using the mirrors 152, 154 and focusing lens 148. The secondary laser beam 156B may be generated by a secondary laser source 158B. The secondary laser beam 156B and secondary laser source 158B may have the same characteristics as described above for the secondary laser beam 156A and secondary laser source 158B.

Variations to the laser delivery systems 134, 134' are possible. One possible variation is to use separate laser sources to generate the separate laser beams 128A, 128B, i.e., instead of splitting a single laser beam 138 into the two separate laser beams 128A, 128B. Another possible variation is to use beam shapers to shape the laser beams 128A, 128B (or the combined beams 128A', 128B') focused into the build zone 104 into a non-round shape, such as rectangular shape or elliptical shape. Such non-round shape may be useful when the preformed material 106 is a flat fiber or the side of the preformed material 106 in opposed relation to the laser beam is flat. Another variation is to use more than two laser delivery paths to deliver laser beams to the preformed material 106. This variation may be useful if the preformed material 106 is a thin sheet or has a relatively large width compared to the spot size of the laser beam (or combined beam). As illustrated in FIG. 2C, laser beams may be delivered to one side of the preformed material 106 along multiple beam paths 160A1, 160A2, 1603 and to the other side of the preformed material 106 along multiple beam paths 160B1, 160B2, 160B3. Three beam paths are shown on each side of the preformed material 106 for illustration purposes. In general, as many beam paths as needed may be used to ensure uniform heating of the preformed material 106 across the width of the preformed material 106. Using the same coordinate system as in FIG. 1, the width of the preformed material 106 is taken to be the dimension along the Y axis.

Returning to FIG. 1, the hot spot 126 is created in the build zone 104 at a select location between the feed outlet 118 and the build surface 130, i.e., top surface, of the build plate 102. It is preferable that the hot spot 126 is not created on the build surface 130 of the build plate 102 or within the build plate 102 since this can cause undesired heating and/or ablation of the build plate 102. In one embodiment, the grazing angles of the laser beams, i.e., the angles between the laser beams 128A, 128B and the build surface 130 of the build plate 102, are selected such that the laser beams 128A, 128B will not impinge on the build surface 130 of the build plate 102. This is to avoid creation of a hot spot on the build surface 130 of the build plate 102 or within the build plate 102. The laser beams 128A, 128B may be parallel or at shallow angles (near parallel) to the build surface 130 to avoid impinging on the build surface 130 of the build plate 102. The appropriate shallow angles can be determined by geometry.

In one embodiment, the distance between the hot spot 126 and the build surface 130 can vary from ⅓ to 1 times the thickness (or diameter) of the preformed material 106 delivered through the hot spot 126. In general, the distance between the hot spot 126 and the build surface 130 will depend on the type of bonding surface desired between layers of preformed material deposited on the build surface 130. The interface between the build surface and the first layer of the 3D structure is a "bonding surface." Each boundary between layers of the 3D structure also constitutes a "bonding surface."

Heaters 132 may be positioned near the build plate 102 to create a controlled thermal environment around the build plate 102. The controlled thermal environment may allow the build plate 102 to be maintained in a certain temperature range while depositing the preformed material 106 on the build plate 102. The controlled thermal environment may minimize stresses in the material deposited on the build plate 102 by preventing rapid cooling of the material, particularly if the material is glass or glass-ceramic. In one embodiment, the build plate 102 is made of glass, and the heaters 132 maintain the temperature of the build plate 102 at substantially the annealing point of the glass (i.e., the temperature at which the glass reaches a viscosity of $10^{13.4}$ poise). "Substantially" may mean, for example, within +/−20° C. of the annealing point of the glass. In another embodiment, the build plate 102 is made of glass-ceramic, and the heaters 132 maintain the temperature of the build plate 102 just below the sintering point of the glass-ceramic. For example, the glass-ceramic build plate may be maintained at 0.1 to 10° C. below the sintering point. Another possibility is to control the temperature of the build plate 102 such that the temperature differential between the build plate 102 and the material deposited on the build plate 102 is minimized.

A pressure source 162 or vacuum source 164 may be connected to the preformed material 106 if the preformed material 106 is a hollow fiber. A suitable control valve 163 may determine which of the pressure source 162 and vacuum source 164 is connected to the preformed material 106. While feeding the preformed material 106 into the build zone 104, pressure or vacuum can be selectively applied to the core of the preformed material 106 to expand or collapse the core, respectively. Typically, the expansion or collapse of the core will occur in the build zone 104, where the preformed material 106 will be at a temperature at which it can be shaped due to the heating by the hot spot 126. This process will allow further shaping of a section of the preformed material 106 prior to depositing the section of the preformed material 106 on the build plate 102.

A process for printing a 3D object according to one embodiment may include describing a set of object layers that can be stacked one on top of another to form the 3D object. In one embodiment, the set of object layers contains at least two object layers. Each object layer may be a cross-sectional slice of the 3D object. The description of each object layer includes the geometric data needed to construct the object layer. From the description of each object layer, the shape of the layer and features in the layer may be determined. Features may be, for example, partial-depth holes, through-holes, channels, voids, engraved marks, and the like. The description may include other information such as thickness of the object layer.

In one embodiment, the 3D object may be described as a set of object layers by drawing each object layer of the 3D object using a suitable drawing or illustration tool. Each object layer may be drawn just prior to building the object layer or as the object layer is being built, or all the object layers may be drawn at the same time and stored for later use.

In another embodiment, the 3D object may be described as a set of object layers by constructing a model of the 3D object using a CAD software (or, in general, solid modeling software). The CAD software may output a .stl file containing a tessellated model of the 3D object. A tessellated model is an array of triangles representing the surfaces of the CAD model. The .stl file would contain the coordinates of the vertices of these triangles and indices indicating the normal of each triangle. The tessellated model may be sliced into layers using a suitable slicing software, where each slice would represent an object layer of the 3D object.

In yet another embodiment, the 3D object may be described as a set of object layers by scanning a prototype of the 3D object and deriving the definition of the object layers from the scanned image using a suitable software system.

The process for printing the 3D object may include determining the type of preformed material(s) to be used in forming each layer of the object. The process for printing the 3D object may include using the geometric data for the layer, and the type of preformed material(s) to be used in forming the layer to determine the material deposition pattern for the layer. The process for printing the 3D object may include determining for each layer the relative motion between the build plate 102 and the feed outlet 118 to form the material deposition pattern for the layer. The process for printing the 3D object may include determining for each layer the laser power required to form the hot spot 126 based on the preformed material type, the feed rate of the preformed material 106 into the build zone 102 based on the preformed material type and the material deposition pattern, the "deposition distance" during deposition of the preformed material, and the hot spot distance during deposition of the preformed material. The "deposition distance" is the vertical distance through which the preformed material travels from the feed outlet 118 to the build surface 130 or to a topmost object layer on the build surface 130. The deposition distance can be set prior to deposition of each object layer and varied during deposition of each object layer to achieve a specified thickness profile of the object layer or to achieve a desired bonding surface between object layers. The "hot spot distance" is the vertical distance between the hot spot 126 and the build surface 130 or the topmost object layer on the build surface 130. The hot spot distance and laser power can be selected to achieve full transparency when working with glass or glass-ceramic preformed materials. For example, fully transparent glass may be achieved if the temperature of the hot spot 126, as determined by the laser power used in creating the hot spot 126, is set to just below the melting point of the preformed glass, e.g., 5 to 10° C. below the melting point, and the hot spot distance is in a range from ⅓ to 1 of the diameter (or thickness) of the preformed glass.

The system 90 may include a controller 95 that manages the building of the 3D object using the "build data," i.e., the description of the object layers and other related data, such as preformed material type, preformed feed rate, laser power, deposition distance, and so forth, as described above. The controller 95 may read the build data from a suitable storage or may receive the build data as needed from an application or through user input. The controller 95 may make various decisions on when and were to send command signals in the system. The controller 95 may send signals to the feed system 100 to feed one or more preformed materials into the build zone 104 at a specified feed rate. The controller 95 may send signals to the laser delivery system 134 to deliver the laser beams 128A, 128B at the appropriate power level to achieve the hot spot 126. During deposition of the preformed material(s) 106, the controller 95 may send signals to the positioning system 120 to move the build surface 102 relative to the feed outlet 118 in a particular pattern appropriate for the object layer being built. The controller 95 may also send signals to the positioning system 120 to adjust the deposition distance. The controller 95 may also send signals to the control valve 163 to connect either of the pressure source 162 and vacuum source 164 to the preformed material 106. The controller 95 may also send signals to the heaters 132 to maintain the build surface 130 at a certain temperature. The system 90 may include appropriate communication links between the controller 95 and the other system components. An alternative to controlling the positioning system 120 via the controller 95 is to connect the positioning system 120 to a drawing tool. In this case, as an object layer is drawn (as described above for one embodiment of describing the set of object layers), the drawing action may be translated into relative motion between the build surface 102 and the feed outlet 118.

To build a first object layer using the system of FIG. 1, the hot spot 126 is created between the feed outlet 118 and the build surface 130. The laser power delivered to the hot spot 126 will depend on the preformed material(s) to be used in building the first object layer. The hot spot distance, i.e., the distance between the hot spot 126 and the build surface 130, and the deposition distance, i.e., the distance between the feed outlet 118 and the build surface 130, are set to predetermined values, which may be based on build data. For example, if forming a fully transparent glass object, the hot spot distance may be in a range from ⅓ to 1 of the thickness (or diameter) of the preformed material.

The feed system 100 is used to feed a select preformed material 106 into the build zone 104 at a feed rate appropriate for the first object layer. The preformed material 106 is selected based on the build data for the first object layer. For illustration purposes, the preformed material 106 may be made of glass. In one example, which is not to be considered as limiting, the glass may be selected from Corning EXG, 714 AVC, Gorilla glasses (2317, 2318, 2319, 2320), silica, and pyrex. The feed rate of the preformed material 106 into the build zone 104 may be selected based on the type of preformed material 106 and the material deposition pattern of the first object layer. The feed rate may also be correlated to the desired viscosity of the preformed material at the hot spot 126. In some embodiments, the feed rate, which may be related to the rotational speed of the feed wheels 108A, 108B, may be in a range from 1 mm/s to 5 mm/s. In some cases, more than one preformed material 106 may be needed to complete the first object layer. In such cases, the desired preformed materials may be fed into the build zone 104 at a predetermined sequence specified in the build data. Where multiple preformed materials are used, there is liberty in selecting the material type, cross-sectional shape, and dimensions of the preformed materials, thereby enabling great complexity in printing of the object layer.

Figure 3:
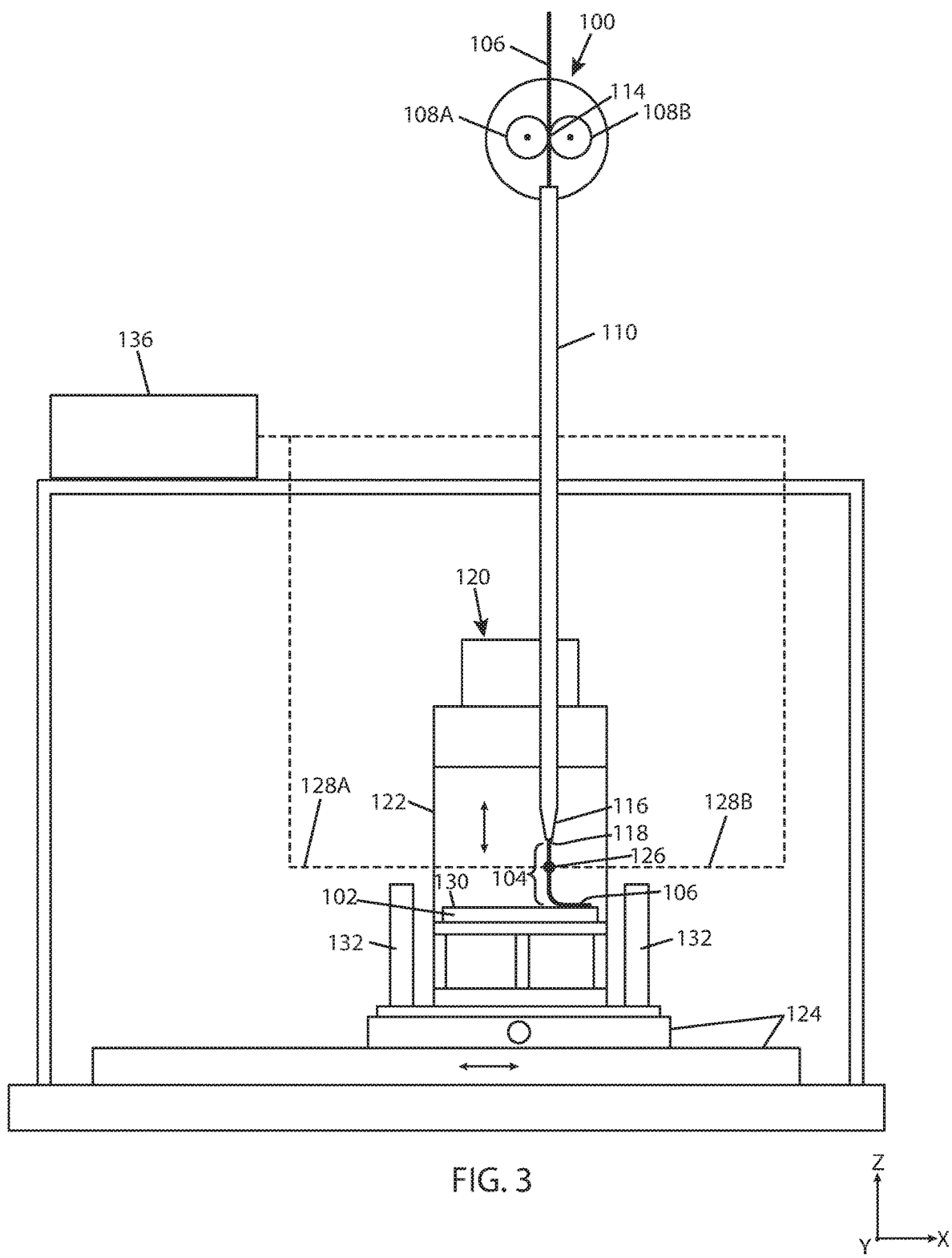
FIG. 3 shows a preformed material being deposited on a build plate.

Each preformed material 106 passed into the build zone 104 is selectively heated to a viscous state (or to a temperature between the annealing point and up to the melting point of the preformed material) at the hot spot 126. In one embodiment, for the glasses listed above, a laser power range of 10 W to 45 W may be used to create the hot spot 126. The selectively heated performed material 106 is then deposited on the build surface 130 of the build plate 102 in a material deposition pattern corresponding to the first object layer. For illustration purposes, FIG. 3 shows the preformed material 106 traversing the deposition distance (i.e., the distance between the feed outlet 118 and the build surface 130), passing through the hot spot 126, and being deposited on the build surface 130 of the build plate 102. Relative motion between the feed outlet 118 and the build plate 102 controls how the preformed material 106 is laid on the build surface 130 to form the desired material deposition pattern for the first object layer. It should be noted that any translation of the feed outlet 118 will need to be synchronized with the focal points of the laser beams 128A, 128B such that the hot spot 126 created by the laser beams 128A, 128B is aligned with the feed outlet 118. If the relative motion between the feed outlet 118 and build plate 102 is restricted to moving the build plate 102 relative to the feed outlet 118, then it may not be necessary to adjust the position of the hot spot 126 or where the laser beams 128A, 128B are focused.

Figure 4:
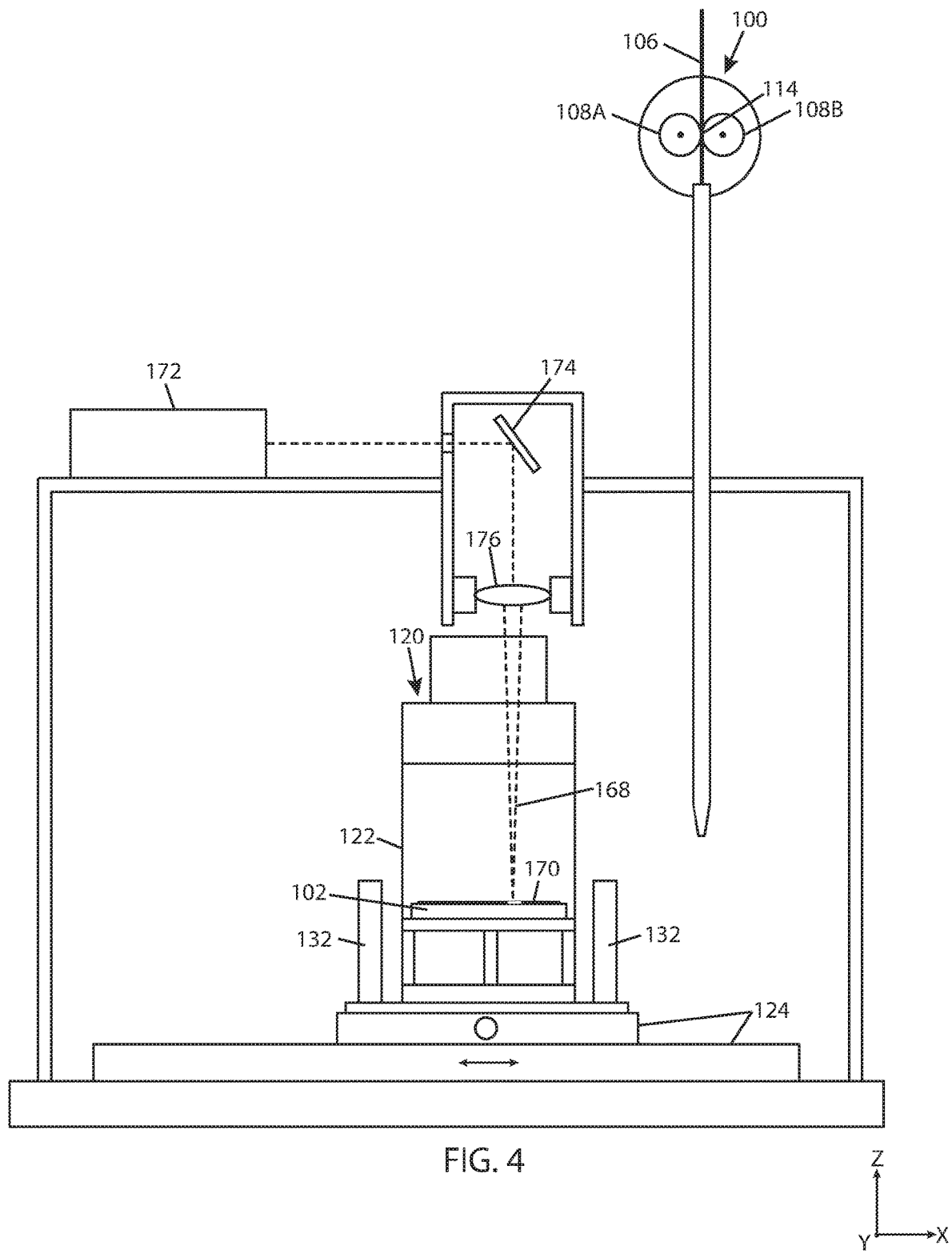
FIG. 4 shows forming of features in an object layer using a laser beam.

After the material deposition pattern for the first object layer is complete, features may be formed in the material deposited on the build plate 102 to complete the first object layer. The features formed will depend on the structure of the first object layer. As previously discussed, features may be partial-depth holes, through-holes, voids, channels, engraved marks, and the like. FIG. 4 shows an example where a focused laser beam 168 is used to form features in an object layer 170 (made of deposited preformed material) on the build plate 102. (The laser delivery system for the hot spot is not shown in FIG. 4 for convenience. Also, the feed system 100 has been moved to the side for convenience.) A laser source 172, mirror 174, and focusing lens 176 may be used to provide the focused laser beam 168. Relative motion between the build plate 102 and the focused laser beam 168 will allow the focused laser beam 168 to scan the object layer 170 on the build plate 102 and form features in desired areas of the object layer 170. The relative motion may be provided by the positioning system 120, or optical elements such as scanning mirror and the like may be used to provide the desired scanning of the focused laser beam 168 across the object layer. The laser beam may also be used to polish the first object layer.

Figure 5:
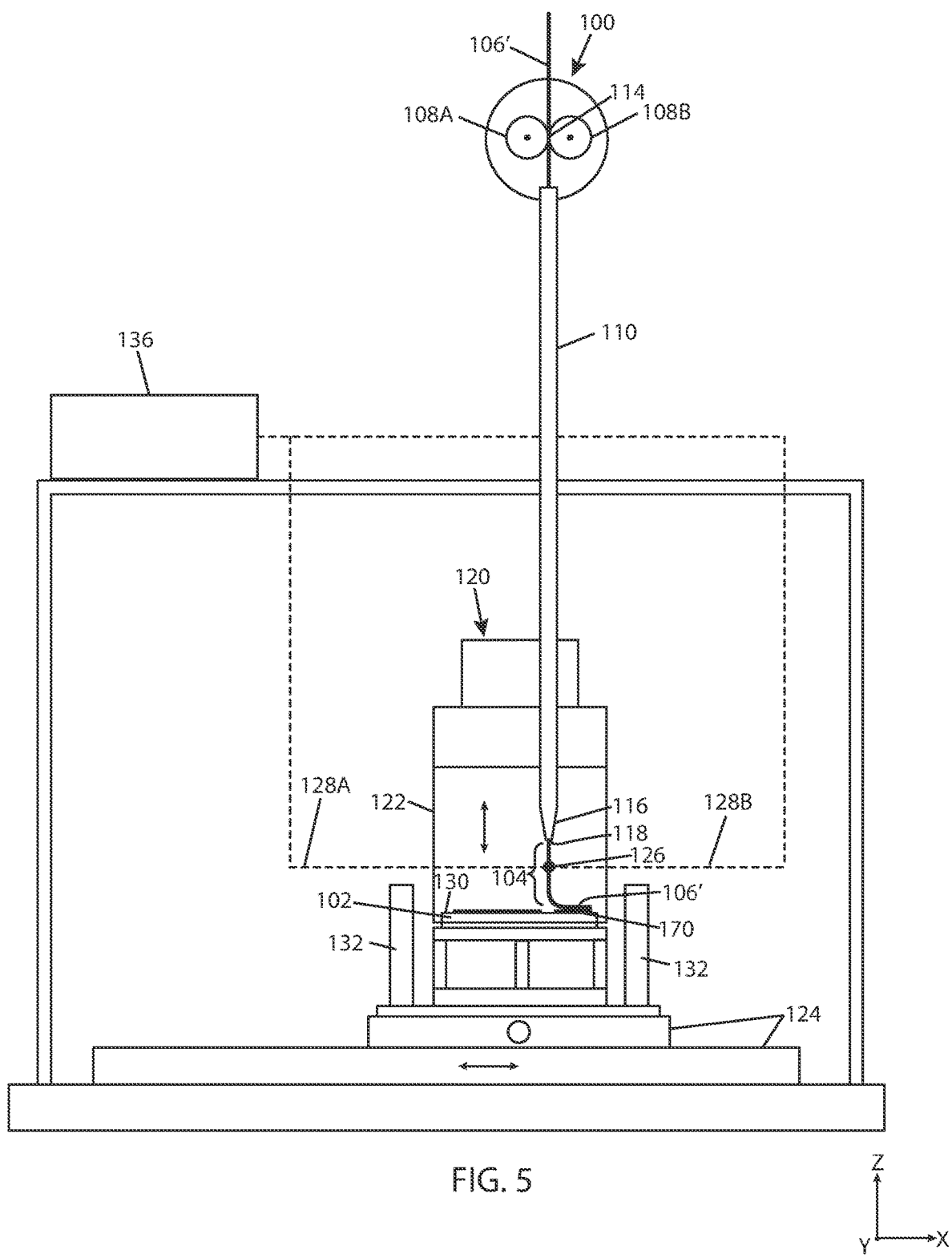
FIG. 5 shows forming a second object layer on a first object layer.

After the first object layer is complete, a second object layer can be built on top of the first object layer. In FIG. 5, the first object layer is identified at 170. To build the second object layer, the deposition distance between the feed outlet 118 and the top of the first object layer 170 may be adjusted using the positioning system 120 and based on the build data for the second object layer. After positioning the first object layer 170 at the desired distance relative to the feed outlet 118, the hot spot 126 can be created using the laser beams 128A, 128B. Forming of the second object layer will continue as described above for the first object layer. That is, one or more preformed materials 106' are fed in a predetermined sequence to the build zone 104, where each preformed material is selectively heated by the hot spot 126 to a viscous state in the build zone 104 and then deposited on top of the first object layer 170 in a material deposition pattern corresponding to the second object layer. Relative motion between the feed outlet 118 and the build plate 102, while keeping the hot spot 126 aligned with the feed outlet 118, will control how the preformed material is laid on top of the first object layer to form the material deposition pattern for the second object layer. During the deposition, the preformed material 106' for the second object layer deposited on the first object layer 170 may fuse with the first object layer 170 at least in the portions where the preformed material 106' for the second object layer is in the viscous state and contacts the first object layer 170. After completion of the second object layer, a focused laser beam may be applied to the stack of first and second object layers to ensure that the second object layer is joined to the first object layer. Also, a focused laser beam may be used to form features in the second object later, as described above for the first object layer and illustrated in FIG. 4. Additional object layers can be built in the same manner described above for the second object layer until the 3D object is complete.

After printing of the 3D object is complete, the 3D object may be annealed to prevent any residual stresses inside the bulk of the object. This may be a useful step if the 3D object is made of glass or glass-ceramic. For glass, the annealing process may include heating the 3D object until the temperature reaches the annealing temperature (also called annealing point) at a viscosity of $10^{13}$ Poise, where the glass is still too hard to deform but soft enough for the stresses to relax. The 3D object is then allowed to heat-soak until its temperature is even throughout. The time necessary for this step varies depending on the type of glass and the maximum thickness of the object. The object is then slowly cooled at a predetermined rate until its temperature is below the strain point (viscosity of $10^{14.5}$ Poise). Following this, the temperature can be safely lowered to room temperature at a rate limited by the heat capacity, thickness, thermal conductivity, and thermal expansion coefficient of the glass. After the annealing process, the object can be cut to size, drilled, or polished.

An additional step may be taken to separate the 3D object from the build plate 102 if the build plate 102 is not desired as part of the final 3D object. One possible method for doing this is to make the build plate 102 of a material that is different from that of the 3D object (or the preformed material(s) used in building the 3D object) and then separate the build plate 102 from the 3D object by selective etching. In one embodiment, the build plate 102 may be made of a glass that is soluble in a select solvent, and the 3D object may be made of glass or glass-ceramic that is insoluble in the select solvent. In this case, the build plate 102 can be removed from the 3D object by dissolving the build plate 102 in the select solvent. Another possible method is to separate the build plate 102 from the 3D object by machining techniques, such as grinding, polishing, and the like.

The process and system described above can be used to build complex 3D objects. Examples of 3D objects that can be manufactured using the process and system are embedded waveguides, laminate structures, and other complex 3D structures. Further examples of 3D objects that can be built include, but are not limited to, simple stacked lines to form an upright glass wall, a hollow cube, a hollow 3D triangle, a "wood stack" 3D structure, a lattice structure, an array of suspended perpendicular rods that are only joined at their respective ends (these rods can be controlled to be sagging, straight, or raised to form a curved roof), a suspended spring, a hollow cylinder with joint layers or spirals, posts, and struts. The preformed material viscosity can also be controlled to make drops of different sizes that can be stacked into a 3D shape.

The preformed material(s) used in building the 3D objects can be transparent glass or glass-ceramic, which would enable building of 3D glass or glass-ceramic objects that are transparent. The transparency of the preformed material(s) will be preserved in the printed 3D object because the printing method avoids use of binders and powders while building the object layers, that is, the transparency of the 3D object will be nominally the same as the transparency of the preformed material(s) used in building the 3D object. In one embodiment, a 3D object may be considered as transparent if it has a transmittance of at least 80% in a range from 390 nm to 700 nm as measured by a spectrophotometer. In another embodiment, a 3D object may be considered as transparent if visibility through the 3D object is without optical distortion. In yet another embodiment, a 3D object may be considered as transparent if there are no visible interfaces along one or more axis of the 3D object.

A 3D object made by the process and system described above may also be smooth due to the preformed material(s) used in building the 3D object being smooth and/or due to fire-polishing of the 3D object. The fire-polishing may be carried out using a laser beam as each layer of the 3D object is formed.

A 3D object made by the process and system described will not require sintering if the preformed material(s) are already consolidated, which would avoid the shrinkage of parts typically observed with 3D printing methods using loose powder as raw material.

Figure 6A:
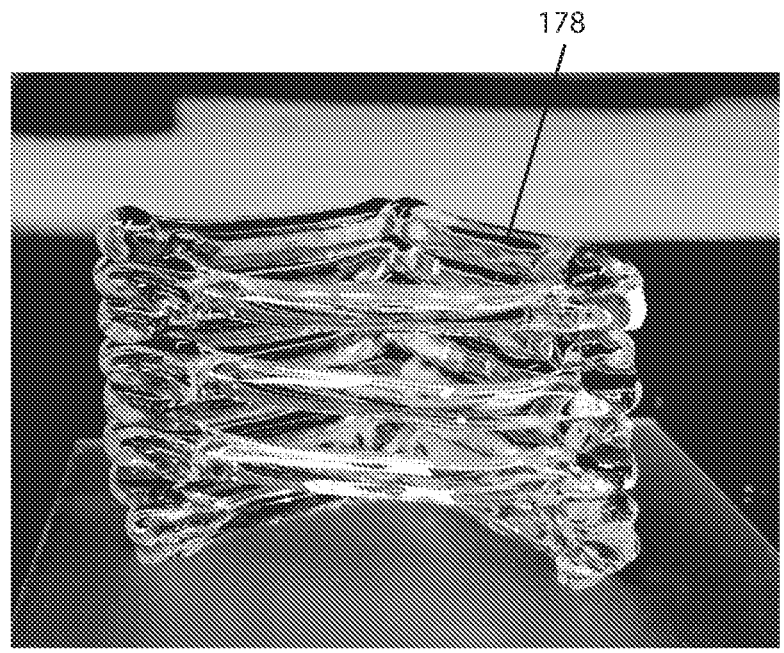
FIGS. 6A and 6B show photographs of an example 3D object built according to one embodiment.
Figure 6B:
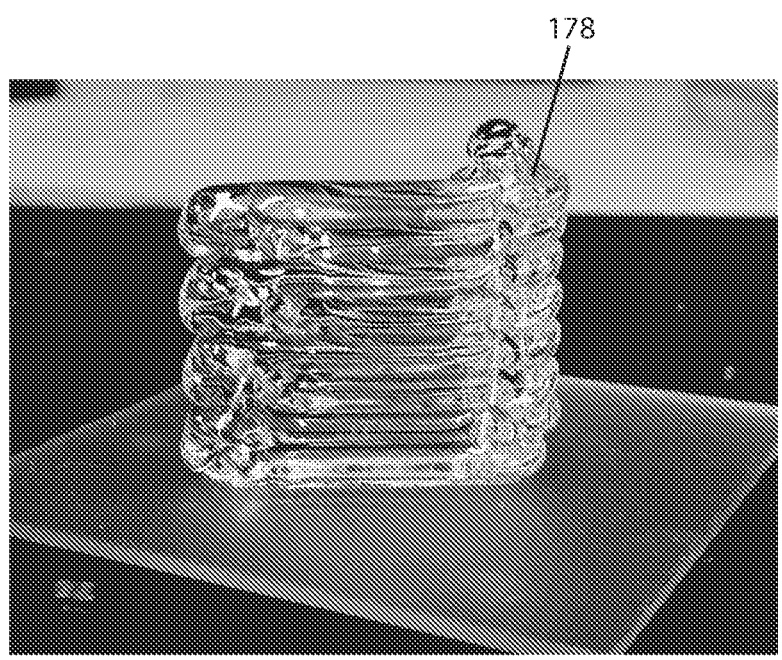

FIGS. 6A and 6B shows photographs of an example triangular 3D object 178 formed using the system and method described above. The 3D object 178 has for layers. Each layer is made of a rod deposited so as to form a triangular. The rods are stacked one on top of another and fused together. The 3D object 178 was formed using 3 mm diameter pyrex rod as the preformed material. The feed rate of the preformed material was 1.5 mm/s. The translation stage speed was 1.0 mm/s. Two laser beams were used to create the hot spot, with each laser beam power being 17 W. The photographs show that the 3D object 178 is transparent. By transparency, it is meant that visibility through the 3D object is without any optical distortion or that there are no visible internal interfaces along one or more axis of the 3D object or that the transparency of the 3D object is nominally the same as or similar to the transparency of the preformed material used in forming the 3D object.

Figure 7:
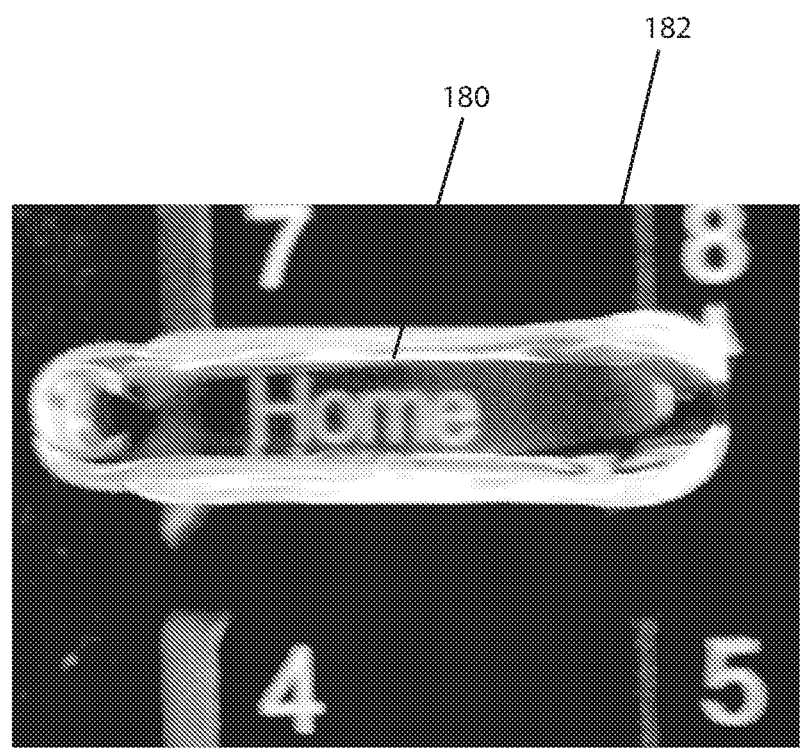
FIG. 7 shows a photograph of an example 3D object built and polished according to one embodiment.

FIG. 7 shows another 3D object 180 formed using the system and method described above. In this case, the top and bottom surfaces of the 3D object 180 have been made flat by polishing. The photograph shows that the 3D object 180 is transparent, i.e., the text "Home" on the background 182 on which the 3D object 180 is placed is visible through the 3D object 180 without any optical distortion.

In an aspect (1) the disclosure provides a method of printing a three-dimensional object, comprising: providing a description of the three-dimensional object as a set of at least two object layers that can be stacked one on top of another to form the object and providing a material deposition pattern for each object layer; creating a hot spot in a build zone located between a feed outlet and a build surface; feeding one or more preformed materials in a predetermined sequence through the feed outlet into the build zone and using the hot spot to selectively heat the one or more preformed materials to a viscous state; forming a first object layer of the set of object layers by depositing a first portion of the one or more preformed materials on the build surface from the build zone and effecting a relative motion between the build surface and the feed outlet during the depositing such that the first portion of the one or more preformed materials forms the material deposition pattern corresponding to the first object layer; and forming a second object layer of the set of object layers by depositing a second portion of the one or more preformed materials on the build surface from the build zone and effecting a relative motion between the build surface and the feed outlet during the depositing such that the second portion of the one or more preformed materials forms the material deposition pattern corresponding to the second object layer.

In another aspect (2), the disclosure provides the method of aspect (1), wherein creating the hot spot comprises directing at least one laser beam into the build zone.

In another aspect (3), the disclosure provides the method of aspect (1) or aspect (2), wherein creating the hot spot comprises directing at least two laser beams into the build zone, the at least two laser beams being arranged to approach the build zone from different directions.

In another aspect (4), the disclosure provides the method of aspect (3), wherein creating the hot spot comprises selecting an angle between each laser beam and the build surface such that the laser beam does not impinge on the build surface while directed to the build zone.

In another aspect (5), the disclosure provides the method of aspect (2), wherein creating the hot spot comprises generating the at least one laser beam using an infrared laser.

In another aspect (6), the disclosure provides the method of any of aspects (1)-(5), wherein at least one of the preformed materials is composed of glass or glass-ceramic.

In another aspect (7), the disclosure provides the method of aspect (6), wherein at least one of the preformed materials is in the form of a rod, a fiber, a thin sheet, or a ribbon.

In another aspect (8), the disclosure provides the method of aspect (7), wherein at least one of the preformed materials is in the form of a fiber having a hollow core.

In another aspect (9), the disclosure provides the method of aspect (8), further comprising selectively applying vacuum to the hollow core to collapse a diameter of the fiber.

In another aspect (10), the disclosure provides the method of aspect (8) or aspect (9), further comprising selectively applying pressure to the hollow core to expand a diameter of the fiber.

In another aspect (11), the disclosure provides the method of aspect (6), wherein the build surface is made of soluble glass, and further comprising separating the build surface from the first object layer by etching.

In another aspect (12), the disclosure provides the method of any of aspects (1)-(11), wherein the build surface is made of glass, and further comprising maintaining a temperature of the build surface substantially at an annealing temperature of the glass during the depositing.

In another aspect (13), the disclosure provides the method of any of aspects (1)-(12), wherein the build surface is made of glass-ceramic, and further comprising maintaining a temperature of the build surface below and near a sintering temperature of the glass-ceramic during the depositing.

In another aspect (14), the disclosure provides the method of any of aspects (1)-(13), further comprising forming additional object layers of the set of object layers, each forming of an additional object layer comprising depositing an additional portion of the one or more preformed materials on a previously formed object layer and effecting a relative motion between the build surface and the feed outlet during the depositing such that the additional portion of the one or more preformed materials forms the material deposition pattern corresponding to the respective additional object layer.

In another aspect (15), the disclosure provides the method of aspect (14), wherein each object layer is fused to an underlying object at least at one contact point.

In another aspect (16), the disclosure provides the method of aspect (14) or aspect (15), further comprising selectively adjusting a distance between the feed outlet and the build surface prior to forming the second object layer and each additional object layer to achieve a select bonding surface between the object layers.

In another aspect (17), the disclosure provides the method of any of aspects (1)-(16), wherein at least two preformed materials are fed into the build zone, and wherein the at least two preformed materials are different in material composition or dimensions or both material composition and dimensions.

In another aspect (18), the disclosure provides the method of any of aspects (1)-(17), further comprising forming at least one feature in at least one of the formed object layers by using at least one laser beam to remove material from a select area of the at least one of the formed object layers.

In another aspect (19), the disclosure provides the method of any of aspects (1)-(18), further comprising polishing the formed object layers using a laser beam.

In another aspect (20), the disclosure provides the method of any of aspects (1)-(19), further comprising annealing the formed object layers.

In another aspect (21), the disclosure provides the method of any of aspects (1)-(20), wherein a distance between the hot spot and the build surface during forming of the first object layer is in a range from ⅓ to 1 times of a thickness or diameter of the first portion of the one or more preformed materials.

In another aspect (22), the disclosure provides the method of any of aspects (1)-(21), wherein a distance between the hot spot and the first object layer during forming of the second object layer is in a range from ⅓ to 1 times of a thickness or diameter of the second portion of the one or more preformed materials.

In an aspect (23), the disclosure provides an apparatus for printing a three-dimensional object, comprising: a build plate having a build surface; a feed system having a feed outlet positioned above the build surface, the feed system configured to feed a preformed material into a build zone between the feed outlet and the build surface; a laser delivery system arranged to direct at least one laser beam into the build zone to form a hot spot in the build zone; and a positioning system arranged to effect a relative motion between the build surface and the feed outlet.

In another aspect (24), the disclosure provides the apparatus of aspect (23), wherein the laser delivery system comprises at least one laser source generating a laser beam in the infrared range.

In another aspect (25), the disclosure provides the apparatus of aspect (24), wherein the at least one laser source comprises a $CO_2$ laser.

In another aspect (26), the disclosure provides the apparatus of any of aspects (23)-(25), further comprising at least one heater arranged to maintain a temperature of the build plate in a select range.

In another aspect (27), the disclosure provides the apparatus of any of aspects (23)-(26), wherein the build plate is made of glass or glass-ceramic.

In another aspect (28), the disclosure provides the apparatus of any of aspects (23)-(27), further comprising a laser source arranged to provide another laser beam for machining preformed material deposited on the build surface.

In another aspect (29), the disclosure provides the apparatus of any of aspects (23)-(28), wherein the positioning system is capable of providing translation in three orthogonal directions, and wherein the build plate is coupled to the positioning system.

In another aspect (30), the disclosure provides the apparatus of any of aspects (23)-(29), further comprising a controller for synchronizing the positions of the feed outlet, hot spot, and build surface such that preformed material from the build zone is deposited on the build surface in a predetermined manner, the controller being in communication with the positioning system, the laser delivery system, and the positioning system.

In an aspect (31), the disclosure provides a manufactured glass article, comprising: a plurality of glass layers arranged in a stack to form a three-dimensional object having a select shape, each glass layer having a predetermined shape and being fused to an adjacent glass layer at least at one contact point, the glass layers being transparent.

In an aspect (31), the disclosure provides the manufactured glass article of aspect (31), wherein each glass layer is made from at least one preformed material, and wherein a transparency of the glass layer is nominally the same as a transparency of the at least one preformed material.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method of printing a three-dimensional object, comprising:
providing a description of the three-dimensional object as a set of at least two object layers that can be stacked one on top of another to form the object and providing a material deposition pattern for each object layer;
creating a hot spot in a build zone located between a feed outlet and a build surface;
feeding one or more preformed materials in a predetermined sequence through the feed outlet into the build zone and using the hot spot to selectively heat the one or more preformed materials to a viscous state;
forming a first object layer of the set of at least two object layers by depositing a first portion of the one or more preformed materials on the build surface from the build zone and effecting a relative motion between the build surface and the feed outlet during the depositing such that the first portion of the one or more preformed materials forms the material deposition pattern corresponding to the first object layer; and
forming a second object layer of the set of at least two object layers by depositing a second portion of the one or more preformed materials on the build surface from the build zone and effecting a relative motion between the build surface and the feed outlet during the depositing such that the second portion of the one or more preformed materials forms the material deposition pattern corresponding to the second object layer
wherein creating the hot spot comprises directing at least two laser beams into the build zone, the at least two laser beams being arranged to approach the build zone from different directions, and wherein a distance between the hot spot and the build surface during forming of the first object layer is in a range from ⅓ to 1 times of a thickness or diameter of the first portion of the one or more preformed materials.

2. The method of claim 1, wherein creating the hot spot comprises selecting an angle between each laser beam and the build surface such that the laser beam does not impinge on the build surface while directed to the build zone.

3. The method of claim 1, wherein at least one of the preformed materials is composed of glass or glass-ceramic.

4. The method of claim 3, wherein at least one of the preformed materials is in the form of a rod, a fiber, a hollow core fiber, a thin sheet, or a ribbon.

5. The method of claim 4, further comprising selectively applying vacuum to the hollow core fiber to collapse a diameter of the hollow core fiber or selectively applying pressure to the hollow core fiber to expand a diameter of the hollow core fiber.

6. The method of claim 1, further comprising forming additional object layers of the set of object layers, each forming of an additional object layer comprising depositing an additional portion of the one or more preformed materials on a previously formed object layer and effecting a relative motion between the build surface and the feed outlet during the depositing such that the additional portion of the one or more preformed materials forms the material deposition pattern corresponding to the respective additional object layer.

7. The method of claim 6, further comprising selectively adjusting a distance between the feed outlet and the build surface prior to forming the second object layer and each additional object layer to achieve a select bonding surface between the object layers.

8. The method of claim 1, wherein at least two preformed materials are fed into the build zone, and wherein the at least two preformed materials are different in material composition or dimensions or both material composition and dimensions.

9. The method of claim 1, further comprising forming at least one feature in at least one of the formed object layers by using at least one laser beam to remove material from a select area of the at least one of the formed object layers.

10. The method of claim 1, further comprising polishing the formed object layers using a laser beam.

11. The method of claim 1, further comprising annealing the formed object layers.

12. A method of printing a three-dimensional object, comprising:
providing a description of the three-dimensional object as a set of at least two object layers that can be stacked one on top of another to form the object and providing a material deposition pattern for each object layer;
creating a hot spot in a build zone located between a feed outlet and a build surface;
feeding one or more preformed materials in a predetermined sequence through the feed outlet into the build zone and using the hot spot to selectively heat the one or more preformed materials to a viscous state;
forming a first object layer of the set of at least two object layers by depositing a first portion of the one or more preformed materials on the build surface from the build zone and effecting a relative motion between the build surface and the feed outlet during the depositing such that the first portion of the one or more preformed materials forms the material deposition pattern corresponding to the first object layer;
forming a second object layer of the set of at least two object layers by depositing a second portion of the one or more preformed materials on the build surface from the build zone and effecting a relative motion between the build surface and the feed outlet during the depositing such that the second portion of the one or more preformed materials forms the material deposition pattern corresponding to the second object layer; and
forming at least one feature in at least one of the formed object layers by using at least one laser beam to remove material from a select area of the at least one of the formed object layers,
wherein creating the hot spot comprises directing at least two laser beams into the build zone, the at least two laser beams being arranged to approach the build zone from different directions.

* * * * *